June 9, 1959 — S. D. LAWSON — 2,890,163
TWO STAGE CATALYTIC REFORMING PROCESS
Filed Dec. 15, 1955
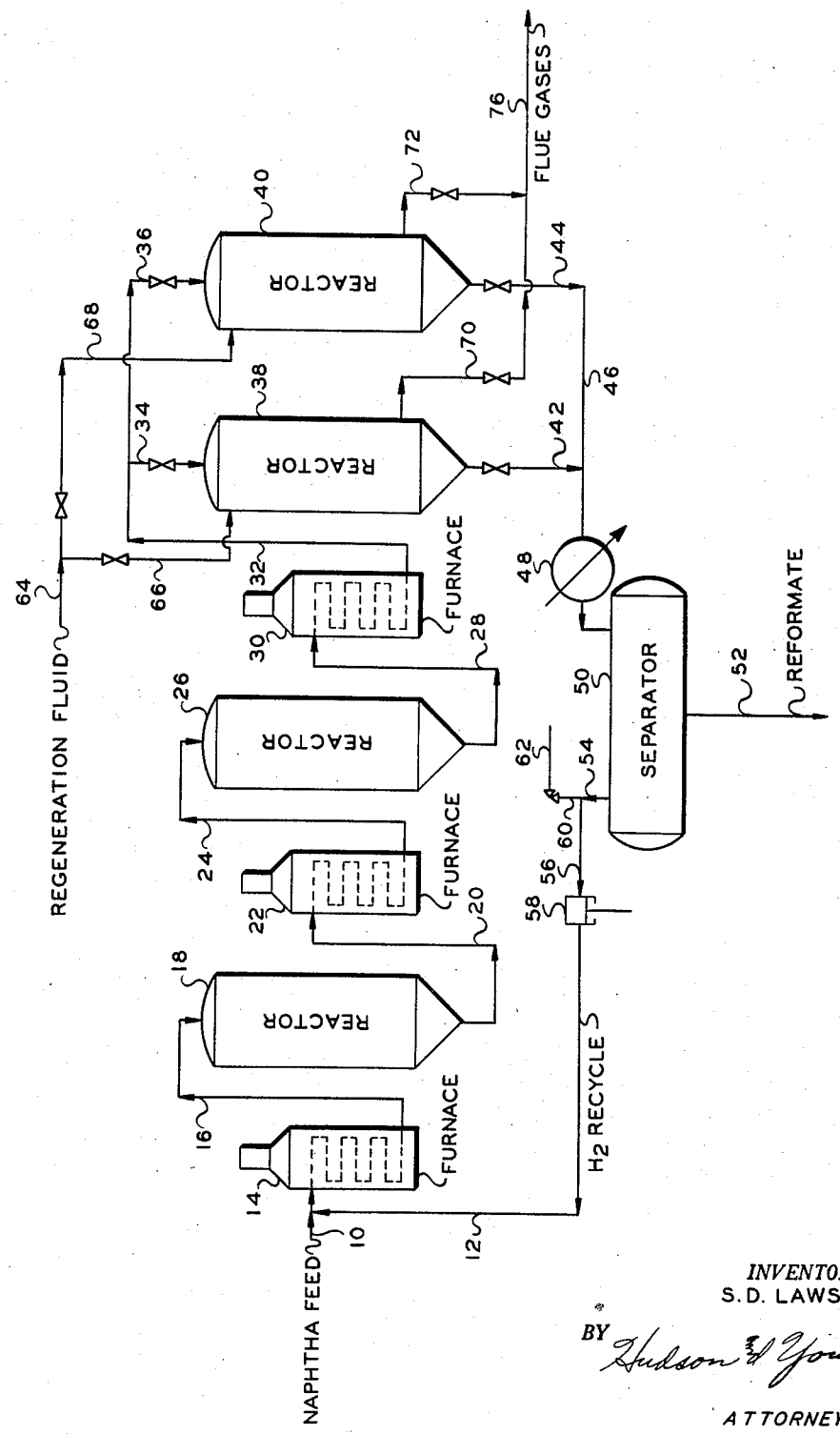
INVENTOR.
S. D. LAWSON
BY Hudson & Young
ATTORNEYS

United States Patent Office 2,890,163
Patented June 9, 1959

2,890,163

TWO STAGE CATALYTIC REFORMING PROCESS

Shelby D. Lawson, Bartlesville, Okla., assignor to Phillips Petroleum Company, a corporation of Delaware Application December 15, 1955, Serial No. 553,320

8 Claims. (Cl. 208—65)

This invention relates to a process for reforming naphtha-containing hydrocarbon fractions boiling in the gasoline range.

The reforming of gasolines in contact with platinum-containing catalysts is conventional in the art. A common platinum type catalyst for this purpose comprises a small concentration of metallic platinum on a support, such as alumina or silica-alumina, with or without the incorporation therein of a small amount of halogen particularly fluorine or chlorine. Reforming as known in the art, refers to the catalytic treatment of various types of gasoline fractions to improve the anti-knock characteristics thereof. The process involves principally selective and controlled cracking in the presence of added hydrogen; however, other reactions taking place include hydrogenation, dehydrogenation, isomerization, and de-aromatization, although to a lesser degree than cracking. In conventional reforming of gasoline in contact with a platinum type catalyst, sufficient carbonaceous materials are deposited on the catalyst to necessitate the periodic regeneration of the same. It has been found that the successful regeneration of platinum-type catalysts deactivated by carbonaceous deposits is extremely difficult if not impractical, whereas the regeneration of platinum-free reforming catalysts is common and commercially practiced. Hence, it is desirable where a platinum-type catalyst is utilized in reforming gasoline to maintain the reforming conditions sufficiently mild to avoid cracking to such an extent that the platinum-containing catalyst requires regeneration.

One possible method of operation comprises utilizing sufficiently mild reforming conditions in a first reactor containing platinum-containing catalyst in the presence of several mols of hydrogen per mol of hydrocarbon and passing the effluent from the first reactor to a second reactor containing a non-platinum type reforming catalyst so as to further reform the feed under more severe reforming conditions and substantially upgrade the same. However, in this method of operation the presence of substantial amounts of hydrogen is normally undesirable because of the hydrogenation of olefins formed by cracking in this step of the process. Of course, it is well recognized that olefins are more desirable in a gasoline than the corresponding paraffins because of higher anti-knock value of the olefins. Undesired hydrogenation in the second reactor can be avoided by removal of free hydrogen from the effluent from the first reactor before passing same to the second reactor; however, this hydrogen removal step requires cooling the entire effluent and reheating the hydrocarbon fraction after removal of the hydrogen which adds materially to the cost of upgrading the original hydrocarbon material.

My invention is concerned with a two-step reforming process which avoids substantial carbon deposition on a platinum-type reforming catalyst in a first reaction zone and which preserves a substantial proportion of the olefins formed in a second reaction zone in contact with a non-platinum type catalyst without removal of the hydrogen from the effluent from the first reaction zone before passing the same to the second reaction zone.

An object of the invention is to provide an improved process for reforming a naphtha-containing hydrocarbon fraction boiling in the gasoline boiling range to improve its anti-knock characteristic. Another object of the invention is to provide a two-step gasoline reforming process, utilizing a platinum-type reforming catalyst in the first step, which avoids the necessity of frequent regeneration of the catalyst. A further object of the invention is to provide a two-step gasoline reforming process utilizing a platinum-free reforming catalyst in the second step which avoids the necessity of removal of hydrogen between steps and preserves a substantial proportion of the olefins formed in the process. Other objects of the invention will become apparent upon consideration of the accompanying disclosure.

The invention comprises a two-step catalytic reforming process wherein a naphtha-containing hydrocarbon fraction boiling in the gasoline boiling range in admixture with hydrogen is charged to a first reaction zone containing a platinum-containing reforming catalyst operated at relatively mild conversion conditions set out below to substantially eliminate formation of coke or carbonaceous deposit, thereby avoiding the requirement of catalyst regeneration, and then passing the effluent or reformate from the first reaction zone without removal of hydrogen to a second reaction zone containing a platinum-free reforming catalyst, preferably bauxite, in which much more severe reforming conditions are maintained. The non-platinum-containing reforming catalyst must be of sufficiently low hydrogenating activity to avoid unduly hydrogenating the olefins produced by the cracking in the second reaction zone. Bauxite has been found to be the most effective catalyst for the second reforming step but certain other catalysts are suitable, including activated alumina, acid activated clays, such as montmorillonite and halloysite, and silica-alumina type catalysts in which one or more of zirconia, thoria, and boria may be substituted for either silica or alumina or added to both oxides to form a composite catalyst having low hydrogenating activity.

The reforming conditions in the second reaction zone are sufficiently severe to deposit a substantial amount of carbonaceous materials on the catalyst but the type of catalyst used in this step is readily regenerable in conventional manner by burning off the carbon deposit with an oxidizing fluid such as diluted oxygen or air.

Conversion conditions maintained in the first reaction zone in contact with the platinum type catalyst include a pressure in the range of 200 to 700 p.s.i., a temperature in the range of 875 to 975° F., a liquid space velocity in the range of 1.0 to 4.0 v./v./h., and a hydrogen recycle in the range of 4 to 8 mols of hydrogen per mol of feed. Under these conditions the reactions occurring in the first reaction zone are mainly dehydrogenation of naphthenes to aromatics and isomerization of paraffins. Reaction conditions in the second reaction zone in contact with the platinum-free reforming catalyst such as bauxite comprise a pressure in the range of 200 to 500 p.s.i., a temperature in the range of 900 to 1100° F., and a liquid space velocity in the range of 1.0 to 6.0 v./v./h. Under the above conditions maintained in the second reaction zone, the reactions occurring are mainly cracking of paraffins and de-aromatization. There is also a small amount of hydrogenation of the olefins formed by cracking of the paraffins but this is minimized by the selection of a reforming catalyst having substantial cracking activity and relatively low hydrogenation activity.

A more complete understanding of the invention may be obtained by reference to the accompanying drawing which provides a diagrammatic flow illustrating the process of the invention. Referring to the drawing, a suitable gasoline stock, containing substantial concentrations of naphthenes and paraffins, is introduced via line 10, in admixture with hydrogen from line 12, into furnace 14 for preheating the feed mixture to the desired temperature for introduction via line 16 into reactor 18. Reactor 18 contains a conventional platinum-containing reforming catalyst in the form of a packed bed, a moving bed, or a fluidized finely divided bed, in accordance with conventional procedures, and conditions therein are maintained under the operating conditions set out above. The effluent from reactor 18 is passed via line 20 to furnace 22 where the temperature is again brought up to the desired operating temperature and the heated stream is passed via line 24 into reactor 26 which also contains a platinum-type catalyst and where the conditions of reaction are maintained within the operating ranges for this type of catalyst set out above. Additional similar furnaces and reactors may be employed to effect the desired amount of reforming under mild reforming conditions. The effluent from the last mentioned reactor is passed via line 28 to furnace 30 where the temperature is raised appreciably to a higher temperature level than is utilized in reactors 18 and 26. The hot effluent, containing reformate and hydrogen, is passed without hydrogen removal via lines 32 and either 34 or 36 into reactor 38 or reactor 40 depending upon which of these reactors is on-stream (while the other is being regenerated). On-stream reaction conditions in reactors 38 and 40 are maintained as set out above and these reactors contain a fixed bed of platinum-free reforming catalyst, such as bauxite. However, where desired, the catalyst in reactors 38 and 40 may be maintained in a moving bed or in a finely divided, fluidized bed in accordance with conventional practice. The reformate is passed via line 42 or 44 to line 46 in which is positioned condenser 48 from which the cooled and condensed stream is passed to separator 50 for separation of the condensed reformate from the normally gaseous hydrocarbon and hydrogen present in the effluent from the last reactor. The hydrogen is recycled through lines 54 and 56 with the aid of compressor 58 to line 12 from which it passes to furnace 14 in admixture with feed in line 10. Line 60 may be utilized to withdraw hydrogen and other light gases from the system, when desired, and additional hydrogen may be introduced to the system via lines 62 and 60.

Regeneration of off-stream reactors 38 or 40 is accomplished by passing regeneration fluid such as air or other oxygen-containing stream into the reactor via lines 64 and 66 or 68 at combustion temperatures so as to burn off the carbonaceous deposit from the catalyst. Combustion or flue gases are removed via lines 70 or 72 and 76 for suitable disposal or use. Since the invention operates the platinum-type catalyst reactor (or reactors 18 and 26) at the moderate or mild conditions prescribed, coke lay-down is substantially negligible. Requirement for regeneration of the platinum-type catalyst which, as is known, is very difficult, is practically eliminated. Since the desired degree of upgrading of the naphtha is not effected with the mild operation in the first reaction zone (or zones), the partially upgraded reformate from this mild reforming step is further processed to the desired degree by the more severe reforming in contact with a bauxite reforming catalyst (or other reforming catalyst of low hydrogenating activity) with concomitant laydown of carbonaceous deposit on the catalyst which is readily regenerable in conventional manner with little or no detrimental effect on the quality of the catalyst.

A typical conventional platinum-type reforming catalyst comprises alumina composited with platinum in the range of about 0.01 to 1.5 weight percent together with combined halogen in the range of about 0.1 to 8 weight percent of the catalyst. In some instances the halogen is omitted. Bases or carriers for the platinum component other than alumina comprise silica composited with one or more of the following: alumina, magnesia, thoria, vanadia, and boria.

The catalyst utilized in the second reaction zone operated under more severe reforming conditions must have low hydrogenating activity in order to avoid hydrogenating a substantial proportion of the olefins formed in the cracking reaction in this reaction zone so as to preserve most of the olefins formed therein and thereby decrease the concentration of paraffins in the final reformate. Catalysts of the type alumina-chromia, alumina-molybdena, alumina-vanadia, and other such catalysts having strong hydrogenating activity are not operable in the invention to produce a final reformate having an appreciable concentration of olefins and a low concentration of paraffins. Suitable catalysts for the second reforming step in addition to bauxite are described above.

The invention encompasses the reforming of any gasoline fraction which comprises naphthenes and paraffins and has particular advantage in the improvement of these gasolines of low octane number including straight run gasoline, natural gasoline, and other gasoline fractions. The feed to the process may comprise either a full boiling range gasoline or a selected fraction thereof which includes naphthenes and paraffins in substantial concentration.

The following example is presented to illustrate the process of the invention and is not to be construed as necessarily or unduly limiting the same.

*Example*

When a 55.4 A.P.I. gravity naphthenic gasoline, original charge, having a boiling range of 175–400° F. and a 39.0 clear octane rating (Research method), is processed in a first reforming zone in accordance with the invention in contact with a catalyst consisting of 0.1% platinum and 0.3% fluorine on alumina at 910° F., 500 p.s.i.g., 2.5 v./v./h. liquid space velocity, and 6 to 1 mol ratio of hydrogen to oil the resulting reformate amounts to 88.2 weight percent of the charge and has a 94.4 octane rating with 3 cc. TEL (Research method). Upon subjecting the resulting reformate to reforming conditions in a second reforming zone in contact with bauxite at 1000° F., 480 p.s.i.g., 1.5 v./v./h. liquid space velocity, and 6 to 1 mol ratio of hydrogen to oil, the final product amounts to 80.0 weight percent of the original charge and has a 99.0 octane rating with 3 cc. TEL (Research method).

The olefin concentration in the final reformate amounts to 2.4 volume percent and is available for producing additional high octane gasoline by alkylation and/or polymerization. By alkylation the yield of 99.0 octane gasoline (3 cc. TEL, Research method) can be raised about 3 weight percent, making a total yield of 83 weight percent.

By conventional reforming with platinum type catalyst to produce 99.0 octane gasoline (3 cc. TEL, Research method), the yield is 81.0 weight percent but the olefin content of the product is substantially zero. In addition, the platinum catalyst is rapidly reduced in activity at the more severe reforming conditions required to effect this upgrading.

Certain modifications of the invention will become apparent to those skilled in the art and the illustrative details disclosed are not to be construed as imposing unnecessary limitations on the invention.

I claim:
1. A process for reforming a naphtha-containing hydrocarbon fraction boiling in the gasoline boiling range, comprising contacting said fraction in a first reaction zone with a platinum-containing reforming catalyst in the presence of hydrogen under mild reforming conditions including a temperature in the range of 875 to 975° F. which substantially avoid carbon deposition on the cata- lyst; contacting effluent hydrocarbons from said first reaction zone in admixture with hydrogen in a second reaction zone with a readily regenerable platinum-free reforming catalyst selected from the group consisting of bauxite, activated alumina, activated clays, and silica-alumina type catalysts under substantially more severe reforming conditions than in said first reaction zone including a temperature at least 100° F. higher than in the first reaction zone and in the range of 975 to 1100° F. which effect substantial carbon deposition on said platinum-free reforming catalyst, the hydrogenation activity of last said catalyst being so low that a substantial proportion of the olefins formed in the process is preserved; and recovering a reformate from the effluent from said second reaction zone.

2. The process of claim 1 wherein said platinum-free reforming catalyst comprises essentially bauxite.

3. A process for reforming a naphtha-containing hydrocarbon fraction boiling in the gasoline boiling range, comprising contacting said fraction in a first reaction zone with a platinum-halogen-containing reforming catalyst in the presence of hydrogen under mild reforming conditions including a temperature in the range of 875 to 975° F. which substantially avoid carbon deposition on the catalyst; contacting in a second reaction zone an effluent from said first reaction zone containing the free hydrogen remaining after reaction in said first reaction zone with a readily regenerable platinum-free reforming catalyst selected from the group consisting of bauxite, activated alumina, activated clays, and silica-alumina type catalysts under substantially more severe reforming conditions than in said first reaction zone including a temperature at least 100° F. higher than in the first reaction zone and in the range of 975 to 1100° F. which effect substantial cracking to produce olefins and carbon, last said catalyst having such a low hydrogenation activity that a substantial proportion of said olefins remain unhydrogenated; and recovering a reformate containing olefins from the effluent from said second reaction zone.

4. The process of claim 3 wherein said platinum-free catalyst consists essentially of bauxite.

5. The process of claim 3 wherein said platinum-free catalyst consists essentially of alumina and silica.

6. Process for reforming a naphtha-containing hydrocarbon fraction boiling in the gasoline boiling range comprising contacting said fraction in admixture with hydrogen in a first reaction zone with a platinum-containing reforming catalyst under mild reforming conditions which substantially avoid carbon deposition on the catalyst including a temperature in the range of 875 to 975° F., a pressure in the range of 200 to 700 p.s.i.g, and a liquid space velocity in the range of 1 to 4 v./v./h., the amount of hydrogen being in the range of 4 to 8 mols per mol of said fraction; contacting in a second reaction zone an effluent from said first reaction zone without removal of hydrogen therefrom with a readily regenerable platinum-free reforming catalyst selected from the group consisting of bauxite, activated alumina, acid activated clays, and silica-alumina type catalysts under substantially more severe reforming conditions than in said first reaction zone which effects substantial cracking of paraffins to olefins with substantial carbon deposition, last said catalyst having such a low hydrogenating activity that a substantial proportion of said olefins remain unhydrogenated, said more severe reforming conditions including a substantially higher temperature than used in said first reaction zone and in the range of 950 to 1100° F., a pressure in the range of 200 to 500 p.s.i., and a liquid space velocity in the range of 1 to 6 v./v./h.; and recovering reformate containing a substantial concentration of olefins from the effluent from said second reaction zone.

7. The process of claim 6 wherein said platinum-free reforming catalyst consists essentially of bauxite.

8. The process of claim 7 wherein the temperature in the second reforming zone is at least 100° F. higher than in said first reforming zone.

References Cited in the file of this patent

UNITED STATES PATENTS

| | | |
|---|---|---|
| 2,389,342 | Conn | Nov. 20, 1945 |
| 2,529,790 | Waddill | Nov. 14, 1950 |
| 2,596,145 | Grote | May 12, 1952 |
| 2,758,062 | Arundale et al. | Aug. 7, 1956 |
| 2,765,264 | Posik | Oct. 2, 1956 |